US012641080B1

(12) United States Patent
Chuprevich et al.

(10) Patent No.: US 12,641,080 B1
(45) Date of Patent: May 26, 2026

(54) SYSTEMS AND METHODS OF DIGITAL ID SHARING

(71) Applicant: Wells Fargo Bank, N.A., San Francisco, CA (US)

(72) Inventors: John Andrew Chuprevich, Davidson, NC (US); John Ionescu, Charlotte, NC (US); Matthew Wheeler, Charlotte, NC (US); Bill Bailey, Charlotte, NC (US); Ling Yee Lindy Sin, San Francisco, CA (US)

(73) Assignee: Wells Fargo Bank, N.A., San Francisco, CA (US)

( * ) Notice: Subject to any disclaimer, the term of this patent is extended or adjusted under 35 U.S.C. 154(b) by 204 days.

(21) Appl. No.: 18/176,711

(22) Filed: Mar. 1, 2023

(51) Int. Cl.
    *H04L 29/06*      (2006.01)
    *H04L 9/40*       (2022.01)

(52) U.S. Cl.
    CPC ...... *H04L 63/0869* (2013.01); *H04L 63/0853* (2013.01)

(58) Field of Classification Search
    CPC ........... H04L 63/0869; H04L 63/0853; H04W 12/33; H04W 12/45
    See application file for complete search history.

(56) References Cited

U.S. PATENT DOCUMENTS

| | | | |
|---|---|---|---|
| 10,977,353 B2 * | 4/2021 | Bender .................. | G06F 21/32 |
| 11,310,225 B2 | 4/2022 | Aiello et al. | |
| 2014/0150068 A1 * | 5/2014 | Janzer ..................... | H04L 63/10 |
| | | | 726/4 |
| 2018/0131509 A1 * | 5/2018 | Walker ............... | H04L 63/0823 |
| 2020/0211409 A1 | 7/2020 | Latorre et al. | |
| 2022/0005039 A1 * | 1/2022 | Hires ................ | G06Q 20/4014 |
| 2023/0319039 A1 * | 10/2023 | Murdoch ........... | H04L 63/0884 |
| | | | 726/9 |

FOREIGN PATENT DOCUMENTS

| | | | | |
|---|---|---|---|---|
| KR | 102050400 B1 * | 12/2019 | .......... | G07F 17/266 |
| KR | 102166259 B1 | 10/2020 | | |

* cited by examiner

*Primary Examiner* — Joseph P Hirl
*Assistant Examiner* — Chi D Nguy
(74) *Attorney, Agent, or Firm* — Kilpatrick Townsend & Stockton LLP

(57) ABSTRACT

Systems and methods for digital ID sharing are disclosed. One disclosed method includes receiving a first digital ID comprising a verified credential of a first user; receiving a second digital ID comprising a verified credential of a second user, verifying a relationship between the first user and the second user, linking the first digital ID to the second digital ID; and outputting a verification message associated with the first digital ID and the second digital ID.

20 Claims, 3 Drawing Sheets

100

300

RECEIVING A FIRST DIGITAL ID
302

RECEIVING A SECOND DIGITAL ID
304

VERIFYING A RELATIONSHIP BETWEEN USERS
306

LINKING THE FIRST DIGITAL ID TO THE SECOND DIGITAL ID
308

OUTPUTTING A VERIFICATION MESSAGE
310

SYSTEMS AND METHODS OF DIGITAL ID SHARING

FIELD OF TECHNOLOGY

The present disclosure generally relates to digital identification (ID) technology and sharing digital IDs.

BACKGROUND

Digital identification technologies allow for entities to verify their identity without having to rely on upon physical identification. For example, a government issued ID, such as a driver's license, can also be issued in electronic form. This digital ID can be used to verify age or identity in addition to confirming that a person has a license to operate a vehicle. However, in some instances multiple people may need to verify a digital ID at the same time (e.g., as a group), which can slow the process for that group.

SUMMARY

According to certain embodiments, a method for digital ID sharing comprises receiving a first digital ID comprising a verified credential of a first user; receiving a second digital ID comprising a verified credential of a second user; verifying a relationship between the first user and the second user; linking the first digital ID to the second digital ID; and outputting a verification message associated with the first digital ID and the second digital ID.

According to another embodiment, a system for digital ID sharing comprises a processor configured to: receive a first digital ID comprising a verified credential of a first user; receive a second digital ID comprising a verified credential of a second user; verify a relationship between the first user and the second user; link the first digital ID to the second digital ID; and output a verification message associated with the first digital ID and the second digital ID.

According to another embodiment, a non-transitory computer readable medium may comprise program code, which when executed by one or more processors, causes the one or more processors to: receive a first digital ID comprising a verified credential of a first user; receive a second digital ID comprising a verified credential of a second user; verify a relationship between the first user and the second user; link the first digital ID to the second digital ID; and output a verification message associated with the first digital ID and the second digital ID.

BRIEF DESCRIPTION OF THE DRAWINGS

A full and enabling disclosure is set forth more particularly in the remainder of the specification. The specification makes reference to the following appended figures.

DETAILED DESCRIPTION

Figure 1:
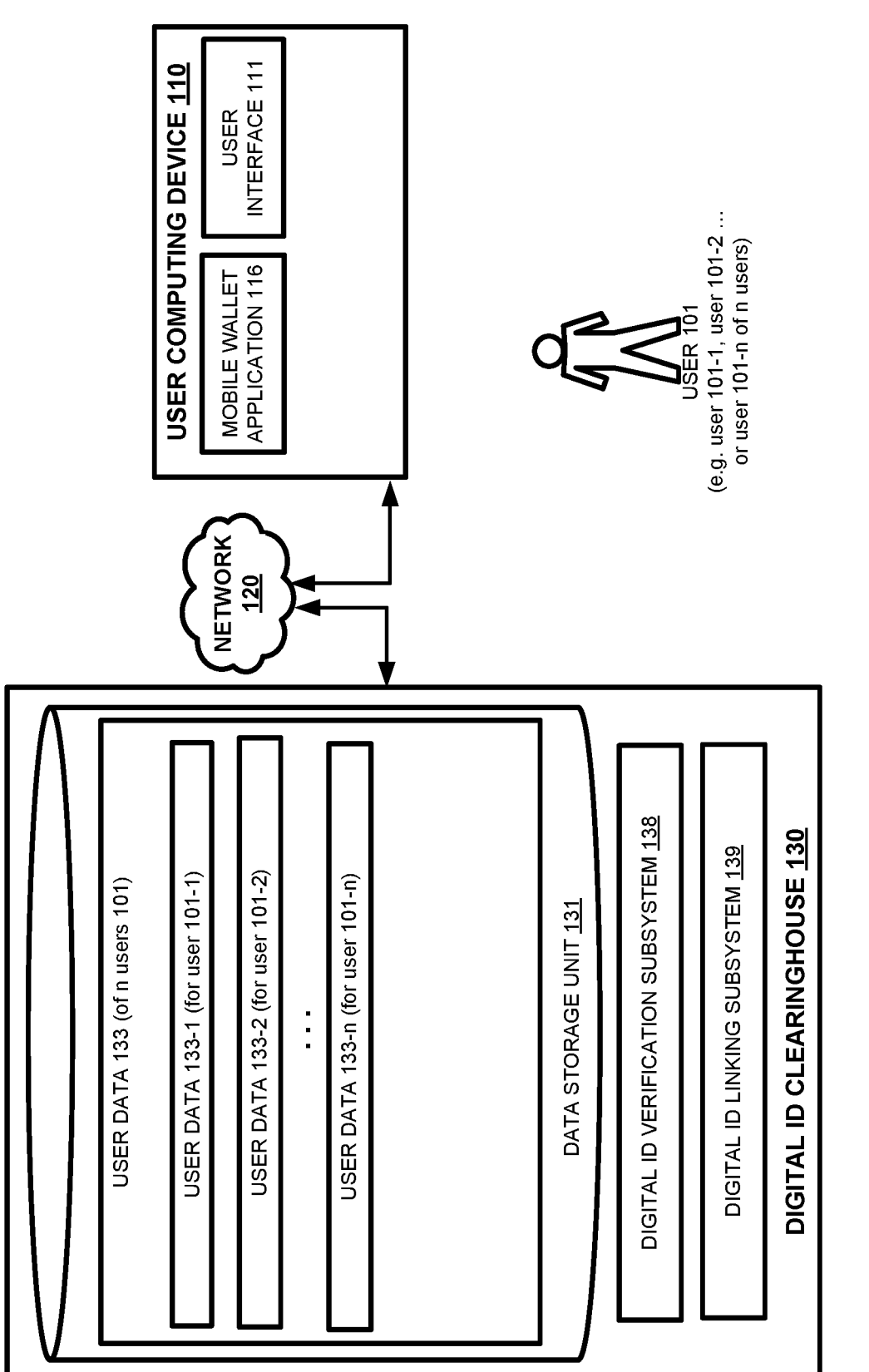
FIG. 1 shows an example system for digital ID sharing according to one embodiment of the present disclosure.

Reference will now be made in detail to various and alternative illustrative examples and to the accompanying drawings. Each example is provided by way of explanation, and not as a limitation. It will be apparent to those skilled in the art that modifications and variations can be made. For instance, features illustrated or described as part of one example may be used on another example to yield a still further example. Thus, it is intended that this disclosure include modifications and variations as come within the scope of the appended claims and their equivalents.

Illustrative Embodiment of Digital ID Sharing

In one illustrative embodiment, a person may have a digital ID issued by a government entity (e.g., a state issued ID card, a driver's license, student ID card, residential ID card, or social security card, or passport) or a private organization (e.g., an employee ID or an ID for a club or organization). This digital ID is stored electronically. The digital ID is accessible via a mobile computing device (e.g., a smartphone, PDA, tablet, or smartwatch) or other computer (e.g., laptop or desktop computer). The user may access this digital ID and present it for similar purposes as a traditional ID card, e.g., to verify age, identify, membership, or licensure. Further, the digital ID may be presented in human readable form or in a machine-readable visual code (e.g., a bar code or QR Code) or wireless message (e.g., a Wi-Fi, Bluetooth, NFC, or other wireless signal) for authenticating or verifying the holder of the digital ID.

Multiple individual users may have their own digital IDs. These individual users may share their digital IDs and subsequently link them such that only one digital ID must be presented or scanned to authenticate or verify an entire group. For example, a guardian digital ID may be selected from the linked digital IDs and configured with increased permissions to access certain data of the linked dependent digital IDs. The guardian digital ID may be associated with a primary user, who may present and authenticate his/her digital ID, e.g., through presenting a human and/or machine-readable message from a mobile device. Due to the digital ID linking, upon successful authentication of the guardian digital ID, the dependent digital IDs associated with the guardian digital ID were presented along with the guardian digital ID and no additional IDs, digital or otherwise, need to be presented.

In some embodiments, the verification and linking of digital IDs may occur on a digital ID clearinghouse accessible via a network connection (e.g., the Internet or a secure network). The digital ID clearinghouse may store user data associated with a plurality of users and their respective digital IDs. The digital ID clearinghouse may compare user data associated with digital IDs in order to determine a relationship between the holders of the digital IDs (e.g., parent-child, guardian, co-worker, spouse, or other type of relationship). Based on this determination, the digital IDs may be linked by the digital ID clearinghouse.

In some embodiments, the linking between digital IDs may be subject to configuration rules which enforce the sharing of data between digital IDs (e.g., a length of time for sharing, data fields/value which may be shared, and/or other sharing permissions). The linking of digital IDs may be implemented on the blockchain using tokens and enforcement of the configuration rules may be accomplished using a smart contract. Additionally, linking between digital IDs may provide a mechanism to increase the trust associated with individual digital IDs. For example, the identity of users who may have limited information (e.g., children) in his/her associated digital ID may be difficult to verify alone but may more easily be verified when linked with more complete digital IDs (e.g., that of a parent).

Once the digital IDs are linked, a user may be able to verify the group of linked digital IDs by scanning only one of the digital IDs. In such an embodiment, the linked digital IDs may be presented as a single visual code (e.g., a bar code or QR Code) or a wireless message (e.g., Wi-Fi, NFC, or Bluetooth signal) that is used for authenticating the entire group at once.

Example Systems for Digital ID Sharing

Referring now to the drawings, FIG. 1 depicts an example of a computing environment for providing digital ID sharing, according to certain embodiments disclosed herein.

The computing environment 100 includes a digital ID clearinghouse 130 that can communicate via a network 120 with one or more user computing devices 110. In certain embodiments, the user device includes a user interface 111 and a mobile wallet application 116.

The user interface 111 enables a user to interact with the user computing device 110. The user interface 111 may be a touch screen interface, a voice-based interface, or any other interface that allows users to provide input and receive output from one or more applications on the user computing device 110. A user of the user computing device 110 may interact with the mobile wallet application 116 via the user interface 111. In an example, the user 101 interacts via the user interface 111 with the mobile wallet application 116 to access a digital ID of the user and link that digital ID to other digital IDs stored in the digital ID clearinghouse 130.

The digital ID clearinghouse 130 can communicate with one or more user computing devices 110 via the network 120. In certain embodiments, the digital ID clearinghouse 130 includes a data storage unit 131, digital ID verification subsystem 138, and a digital ID linking subsystem 139.

The data storage unit 131 may comprise a local or remote storage device or other memory suitable for storing information and accessible to digital ID clearinghouse 130. The digital ID clearinghouse 130 can store, in the data storage unit 131, user data 133, including digital IDs, of a set of n users 101 having accounts with the digital ID clearinghouse 130. For each of the users 101 (e.g., users 101-1, 101-2, . . . 101-n), the digital ID clearinghouse 130 can store, in the data storage unit 131, respective user data 133 (e.g., user data 133-1, 133-2, . . . 133-n) for each of the users 101. In this example, the user data 133-1 includes a digital ID issued by a government entity (e.g., a state issued ID card, a driver's license, student ID card, residential ID card, or social security card, military identification, or passport) or a private organization (e.g., an employee ID or an ID for a club or organization) as well as additional user information beyond that included on a usual ID card, e.g., other information associated with the users such as family relationships, work history, financial information, or transaction or purchase history.

The digital ID clearinghouse further includes a digital ID verification subsystem 138. In some embodiments, the digital ID verification subsystem 138 compares data associated with digital IDs with other data in external databases to verify authenticity of the digital ID. Further, in some embodiments, the digital ID verification subsystem 138 compares data associated with a plurality of digital IDs to verify a relationship between the holders of those digital IDs. For example, in one embodiment, digital ID verification subsystem 138 may compare a primary or first digital ID to a secondary or second digital ID to verify that the holder of the primary digital ID is a parent or guardian of the secondary digital ID. The digital ID verification subsystem 138 may perform this verification by comparing user data 133 for the various users and/or accessing additional user data stored on remote databases. Further, in some embodiments, the digital ID verification subsystem 138 may compare data associated with the users to state or federal government databases to verify relationships between the holders of the digital IDs.

The digital ID clearinghouse further includes a digital ID linking subsystem 139. The digital ID linking subsystem 139 links one or more of the digital IDs based on the determination made by the digital ID verification subsystem 138. Once two or more IDs are linked the digital ID linking subsystem 139 may transmit a separate message to the user computing device 110 to verify that the user IDs are linked and to enable the user to verify that the IDs have been linked. The user may present this message to be scanned by an authority. For example, the authority may comprise a government entity, a licensing entity, a police representative, a security entity (e.g., controlling access to an area restricted based on age or other factors), or any other entity that may otherwise verify IDs. The message may be in the form of a human readable message, a machine-readable message, or a wirelessly transmitted message, as discussed above.

The digital ID clearinghouse 130 (including the digital ID verification subsystem 138 and the digital ID linking subsystem 139) may be implemented using software (e.g., code, instructions, program) executed by one or more processing units (e.g., processors, cores), hardware, or combinations thereof. The software may be stored on a non-transitory storage medium (e.g., on a memory device). The computing environment 100 depicted in FIG. 1 is merely an example and is not intended to unduly limit the scope of claimed embodiments. One of the ordinary skill in the art would recognize many possible variations, alternatives, and modifications. For example, in some implementations, the digital ID clearinghouse 130 can be implemented using more or fewer systems or subsystems than those shown in FIG. 1, may combine two or more subsystems, or may have a different configuration or arrangement of the systems or subsystems.

Figure 2:
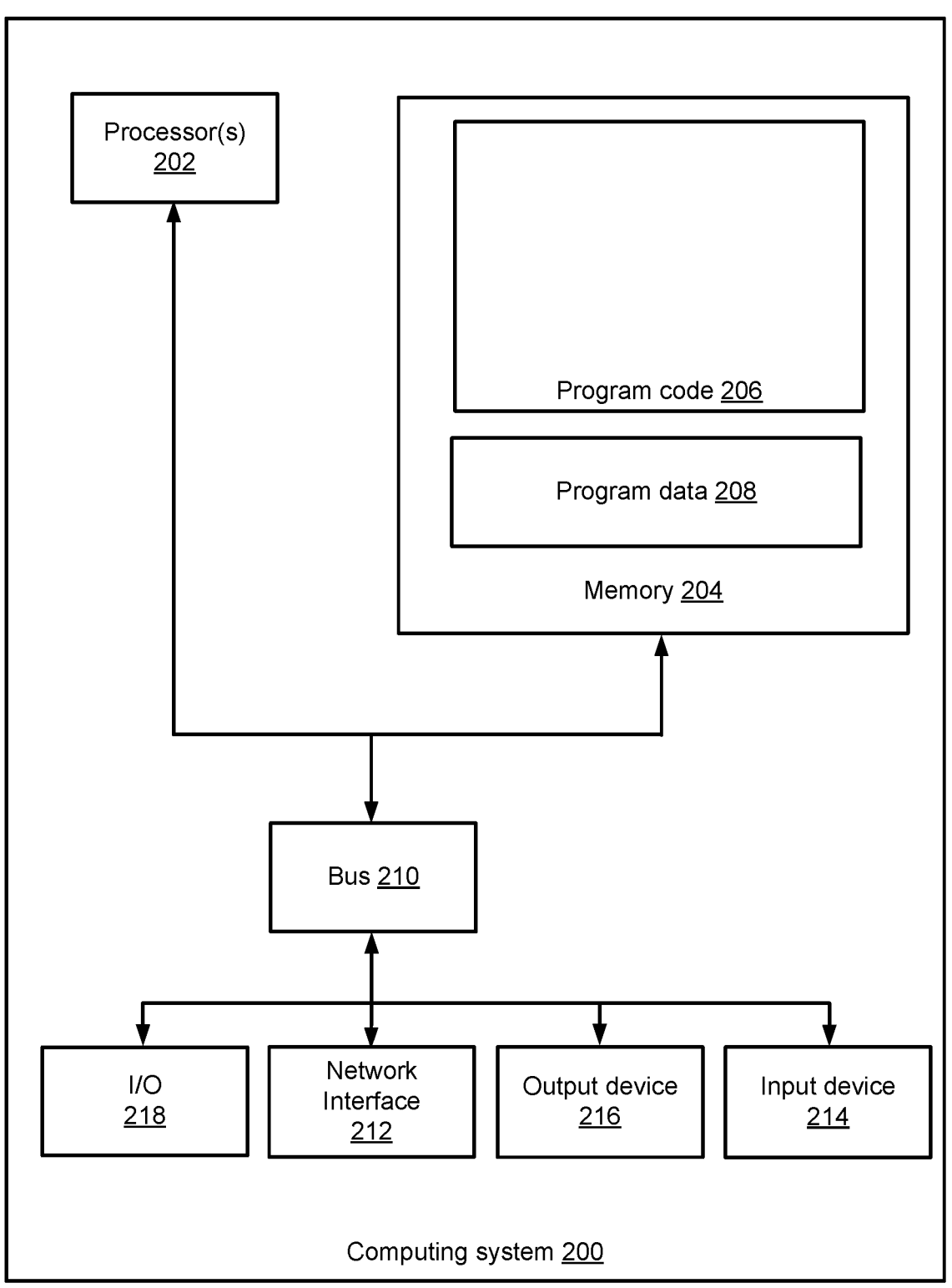
FIG. 2 shows an example mobile device for use in a system for digital ID sharing according to another embodiment of the present disclosure.

Turning now to FIG. 2, which depicts an example of a computer system 100 for implementing digital ID sharing. The depicted example of the computer system 200 includes a processor 202 communicatively coupled to one or more memory devices 204. The processor 202 executes computer-executable program code stored in a memory device 204, accesses information stored in the memory device 204, or both. Examples of the processor 202 include a microprocessor, an application-specific integrated circuit ("ASIC"), a field-programmable gate array ("FPGA"), or any other suitable processing device. The processor 202 can include any number of processing devices, including a single processing device.

The memory device 204 includes any suitable non-transitory computer-readable medium for storing program code 206, program data 208, or both. A computer-readable medium can include any electronic, optical, magnetic, or other storage device capable of providing a processor with computer-readable instructions or other program code. Non-limiting examples of a computer-readable medium include a magnetic disk, a memory chip, a ROM, a RAM, an ASIC, optical storage, magnetic tape or other magnetic storage, or any other medium from which a processing device can read instructions. The instructions may include processor-specific instructions generated by a compiler or an interpreter from code written in any suitable computer-programming language, including, for example, C, C++, C#, Visual Basic, Java, Python, Perl, JavaScript, and ActionScript. In various examples, the memory device 1104 can be volatile memory, non-volatile memory, or a combination thereof.

The computer system 200 executes program code 206 that configures the processor 202 to perform one or more of the operations described herein. The program code 206 may be resident in the memory device 204 or any suitable computer-readable medium and may be executed by the processor 202 or any other suitable processor.

The processor 202 is an integrated circuit device that can execute the program code 206. The program code 206 can be for executing an operating system, an application system or subsystem, or both. When executed by the processor 202, the instructions cause the processor 202 to perform operations of the program code 206. When being executed by the processor 202, the instructions are stored in a system memory, possibly along with data being operated on by the instructions. The system memory can be a volatile memory storage type, such as a Random Access Memory (RAM) type. The system memory is sometimes referred to as Dynamic RAM (DRAM) though need not be implemented using a DRAM-based technology. Additionally, the system memory can be implemented using non-volatile memory types, such as flash memory.

In some embodiments, one or more memory devices 204 store the program data 208 that includes one or more datasets described herein. In some embodiments, one or more of data sets are stored in the same memory device (e.g., one of the memory devices 204). In additional or alternative embodiments, one or more of the programs, data sets, models, and functions described herein are stored in different memory devices 204 accessible via a data network. One or more buses 210 are also included in the computer system 200. The buses 210 communicatively couple one or more components of a respective one of the computer system 200.

In some embodiments, the computer system 200 also includes a network interface device 212. The network interface device 212 includes any device or group of devices suitable for establishing a wired or wireless data connection to one or more data networks. Non-limiting examples of the network interface device 212 include an Ethernet network adapter, a modem, Wi-Fi adapter, Bluetooth adapter, NFC receiver and transmitter, or any other known wired or wireless data transmission system. The computer system 200 is able to communicate with one or more other computing devices via a data network using the network interface device 212.

The computer system 200 may also include a number of external or internal devices, an input device 214, a presentation device 216, or other input or output devices. For example, the computer system 200 is shown with one or more input/output ("I/O") interfaces 218. An I/O interface 218 can receive input from input devices or provide output to output devices. An input device 214 can include any device or group of devices suitable for receiving visual, auditory, or other suitable input that controls or affects the operations of the processor 202. Non-limiting examples of the input device 214 include a touchscreen, a mouse, a keyboard, a microphone, a separate mobile computing device, etc. A presentation device 216 can include any device or group of devices suitable for providing visual, auditory, or other suitable sensory output. Non-limiting examples of the presentation device 216 include a touchscreen, a monitor, a speaker, a separate mobile computing device, etc.

Example Methods for Digital ID Sharing

Figure 3:
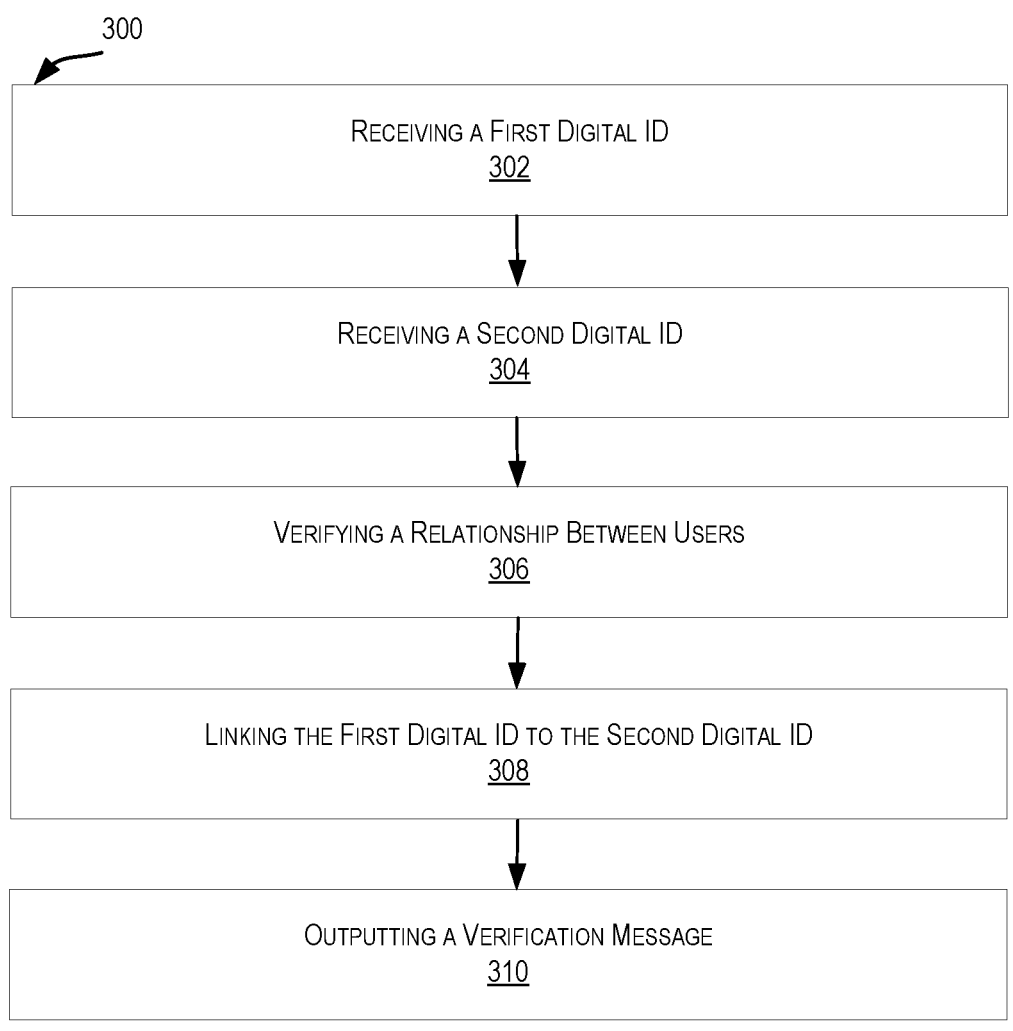
FIG. 3 illustrates a flow chart for a method for digital ID sharing according to another embodiment of the present disclosure.

FIG. 3 is a flowchart showing an illustrative method 300 for digital ID sharing according to one embodiment of the present disclosure. In some embodiments, some of the steps in flow charts of FIG. 3 are implemented in program code executed by a processor, for example, the processor in a general-purpose computer, mobile device, or server. In some examples, these steps are implemented by a group of processors. In some examples the steps shown in FIG. 3 are performed in a different order or one or more steps may be skipped. Alternatively, in some examples, additional steps not shown in FIG. 3 may be performed. The steps of FIG. 3 are shown with reference to digital ID clearinghouse 130 and user computing device 110 shown in FIG. 1.

As shown in FIG. 3, the method 300 begins at step 302 when digital ID clearinghouse 130 receives a first digital ID. The digital ID comprises an ID issued by government entity, or a private organization as discussed above. The digital ID clearinghouse 130 may store this digital ID and other user data associated with the ID holder in a local data store. The digital ID clearinghouse 130 may further authenticate the accuracy of the data associated with the digital ID by comparing the associated user data to user data in other databases, e.g., state or federal government databases or private databases of user data.

Next at step 304, user digital ID clearinghouse 130 receives a second digital ID. The second digital ID is associated with a second user different from the first user, but there may be a relationship between the first user and the second user. The digital ID clearinghouse 130 may store this digital ID and other user data associated with the ID holder in a local data store. As with the first digital ID, the digital ID clearinghouse 130 may further authenticate the accuracy of the data associated with the digital ID by comparing the associated user data to user data in other databases, e.g., state or federal government databases or private databases of user data. The digital ID clearinghouse may receive additional digital IDs and perform similar operations.

Then at step 306, digital ID clearinghouse 130 verifies a relationship between the first and second users associated with the first and second digital IDs. For example, the digital ID clearinghouse 130 may compare a first digital ID to a second digital ID to verify that the holder of the first digital ID is a parent or guardian of the second digital ID. The digital ID verification subsystem 138 may perform this verification by comparing user data 133 for the various users and/or accessing additional user data stored on remote databases. Further, in some embodiments, the digital ID verification subsystem 138 may compare data associated with the users to state or federal government databases to verify relationships between the holders of the digital IDs. The digital ID clearinghouse may receive additional digital IDs and perform similar operations.

Next at step 308, digital ID clearinghouse 130 links the first digital ID to the second digital ID. The digital ID clearinghouse 130 links one or more of the digital IDs based on the determination made at step 306. In some embodiments, the linkage is temporary, e.g., if the relationship is two co-workers attending a conference, the linkage may expire after a time period that is either pre-set or set by one of the ID holders, e.g., a few minutes, hours, or days. In other embodiments, the relationship may be permanent, e.g., in the instance of a parent or guardian and a child.

Then at step 310, digital ID clearinghouse 130 outputs a verification message. The verification message may verify that the user IDs are linked and to enable the user to verify that the IDs have been linked. The user may present this message to be scanned by an authority. For example, the authority may comprise a government entity, a licensing entity, a police representative, a security entity (e.g., controlling access to an area restricted based on age or other factors), or any other entity that may otherwise verify IDs. The message may be in the form of a human readable message, a machine-readable message, or a wirelessly transmitted message, as discussed above.

Example Advantages of Digital ID Sharing

Embodiments of the present disclosure enhance the value if digital IDs through enabling groups to link to a single digital ID and thereby speed the process for that group to authenticate digital IDs. This can reduce wait times, reduce network overhead in environments that may have large crowds, e.g., boarding a flight or entering a crowded stadium, and may further improve network security through verified relationships between users that have linked their digital IDs.

General Considerations

Although the subject matter has been described in language specific to structural features or methodological acts, it is to be understood that the subject matter of the appended claims is not necessarily limited to the specific features or acts described above. Rather, the specific features and acts described above are disclosed as examples.

Various operations of examples are provided herein. The order in which one or more or all of the operations are described should not be construed as to imply that these operations are necessarily order dependent. Alternative ordering will be appreciated based on this description. Further, not all operations may necessarily be present in each example provided herein.

As used in this application, "or" is intended to mean an inclusive "or" rather than an exclusive "or." Further, an inclusive "or" may include any combination thereof (e.g., A, B, or any combination thereof). In addition, "a" and "an" as used in this application are generally construed to mean "one or more" unless specified otherwise or clear from context to be directed to a singular form. Additionally, at least one of A and B and/or the like generally means A or B or both A and B. Further, to the extent that "includes", "having", "has," "with," or variants thereof are used in either the detailed description or the claims, such terms are intended to be inclusive in a manner similar to the term "comprising".

Further, unless specified otherwise, "first," "second," or the like are not intended to imply a temporal aspect, a spatial aspect, or an ordering. Rather, such terms are merely used as identifiers, names, for features, elements, or items. For example, a first state and a second state generally correspond to state 1 and state 2 or two different or two identical states or the same state. Additionally, "comprising," "comprises," "including," "includes," or the like generally means comprising or including.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

Embodiments in accordance with aspects of the present subject matter can be implemented in digital electronic circuitry, in computer hardware, firmware, software, or in combinations of the preceding. In one embodiment, a computer may comprise a processor or processors. The processor comprises or has access to a computer-readable medium, such as a random-access memory (RAM) coupled to the processor. The processor executes computer-executable program instructions stored in memory, such as executing one or more computer programs including a sensor sampling routine, a haptic effect selection routine, and suitable programming to produce signals to generate the selected haptic effects as noted above.

Such processors may comprise a microprocessor, a digital signal processor (DSP), an application-specific integrated circuit (ASIC), field programmable gate arrays (FPGAs), and state machines. Such processors may further comprise programmable electronic devices such as PLCs, programmable interrupt controllers (PICs), programmable logic devices (PLDs), programmable read-only memories (PROMs), electronically programmable read-only memories (EPROMs or EEPROMs), or other similar devices.

Such processors may comprise, or may be in communication with, media, for example tangible computer-readable media, that may store instructions that, when executed by the processor, can cause the processor to perform the steps described herein as carried out, or assisted, by a processor. Embodiments of computer-readable media may comprise, but are not limited to, all electronic, optical, magnetic, or other storage devices capable of providing a processor, such as the processor in a web server, with computer-readable instructions. Other examples of media comprise, but are not limited to, a floppy disk, CD-ROM, magnetic disk, memory chip, ROM, RAM, ASIC, configured processor, all optical media, all magnetic tape or other magnetic media, or any other medium from which a computer processor can read. Also, various other devices may include computer-readable media, such as a router, private or public network, or other transmission device. The processor, and the processing, described may be in one or more structures, and may be dispersed through one or more structures. The processor may comprise code for carrying out one or more of the methods (or parts of methods) described herein.

While the present subject matter has been described in detail with respect to specific embodiments thereof, it will be appreciated that those skilled in the art, upon attaining an understanding of the foregoing may readily produce alterations to, variations of, and equivalents to such embodiments. Accordingly, it should be understood that the present disclosure has been presented for purposes of example rather than limitation, and does not preclude inclusion of such modifications, variations and/or additions to the present subject matter as would be readily apparent to one of ordinary skill in the art.

What is claimed is:

1. A method comprising:

receiving a first digital identification ("ID") comprising a verified credential of a first user;

receiving a second digital ID comprising a verified credential of a second user;

verifying a relationship between the first user and the second user, wherein verifying the relationship comprises establishing a dependency between the first user and the second user such that the first user is classified as a primary user and the second user is classified as a dependent user;

linking the first digital ID to the second digital ID based on the dependency such that the primary user is granted increased permissions to access data associated with dependent users to thereby generate a linkage, wherein linking the first digital ID to the second digital ID is subject to one or more configuration rules defining parameters for sharing specific data values between the first user and the second user, and wherein the one or more configuration rules are pre-set by one of the first user or the second user, wherein the linkage is temporary in time and comprises an expiration time period, wherein the expiration time period corresponds to a length of a scheduled event; and substantially simultaneously verifying an identity of the first user and an identity of the second user without requiring a presentation of the second digital ID and without requiring an action by the second user by:

outputting, for display on a computing device associated with the primary user, a verification message encompassing data associated with the first digital ID and data associated with the linkage; and scanning the verification message, by a computing system associated with a separate entity, to authenticate the first digital ID and the second digital ID and to verify the linkage.

2. The method of claim 1, wherein verifying the relationship between the first user and the second user comprises confirming the verified credentials of the first user and the second user via a remote identification clearinghouse.

3. The method of claim 1, wherein the verification message comprises an image output on a display of the computing device, wherein the computing device comprises a mobile device.

4. The method of claim 3, wherein the image comprises one or more of: a bar code or a QR Code.

5. The method of claim 1, wherein the verification message comprises a wireless signal, wherein the wireless signal comprises one or more of: a Wi-Fi signal, a Near Field Communication ("NFC") signal, or a Bluetooth signal.

6. The method of claim 1, wherein the expiration time period is manually pre-set by one of the first user or the second user, and wherein the scheduled event comprises a conference.

7. The method of claim 1, wherein the relationship between the first user and the second user comprises one of a guardian relationship or a spousal relationship.

8. The method of claim 1, wherein the verified credential comprises a government issued ID.

9. The method of claim 1, further comprising:

receiving a third digital ID comprising a verified credential of a third user;

verifying a relationship between the first user, the second user, and the third user;

linking the third digital ID to the first and second digital IDs; and outputting a verification message associated with the first digital ID, the second digital ID, and the third digital ID.

10. The method of claim 9, wherein the relationship between the first user, the second user, and the third user comprises one of a parent or guardian relationship.

11. A system comprising:

a processor configured to:

receive a first digital identification ("ID") comprising a verified credential of a first user;

receive a second digital ID comprising a verified credential of a second user;

verify a relationship between the first user and the second user, wherein verifying the relationship comprises establishing a dependency between the first user and the second user such that the first user is classified as a primary user and the second user is classified as a dependent user;

link the first digital ID to the second digital ID based on the dependency such that the primary user is granted increased permissions to access data associated with dependent users to thereby generate a linkage, wherein linking the first digital ID to the second digital ID is subject to one or more configuration rules defining parameters for sharing specific data values between the first user and the second user, and wherein the one or more configuration rules are pre-set by one of the first user or the second user, wherein the linkage is temporary in time and comprises an expiration time period, wherein the expiration time period corresponds to a length of a scheduled event; and substantially simultaneously verify an identity of the first user and an identity of the second user without requiring a presentation of the second digital ID and without requiring an action by the second user by:

outputting, for display on a computing device associated with the primary user, a verification message encompassing data associated with the first digital ID and data associated with the linkage; and scanning the verification message, by a computing system associated with a separate entity, to authenticate the first digital ID and the second digital ID and to verify the linkage.

12. The system of claim 11, wherein verifying the relationship between the first user and the second user comprises confirming the verified credentials of the first user and the second user via a remote identification clearinghouse.

13. The system of claim 11, wherein the verification message comprises an image output on a display of the computing device, wherein the computing device comprises a mobile device.

14. The system of claim 13, wherein the image comprises one or more of: a bar code or a QR Code.

15. The system of claim 11, wherein the verification message comprises a wireless signal, wherein the wireless signal comprises one or more of: a Wi-Fi signal, a Near Field Communication ("NFC") signal, or a Bluetooth signal.

16. The system of claim 11, wherein the expiration time period is manually pre-set by one of the first user or the second user, and wherein the scheduled event comprises a conference.

17. The system of claim 11, wherein the relationship between the first user and the second user comprises one of a guardian relationship or a spousal relationship.

18. The system of claim 11, wherein the verified credential comprises a government issued ID.

19. The system of claim 11, wherein the processor is further configured to:

receive a third digital ID comprising a verified credential of a third user;

verify a relationship between the first user, the second user, and the third user;

link the third digital ID to the first and second digital IDs; and output a verification message associated with the first digital ID, the second digital ID, and the third digital ID.

20. A non-transitory computer readable medium comprising instructions that when executed by one or more processors cause the one or more processors to:

receive a first digital identification ("ID") comprising a verified credential of a first user receive a second digital ID comprising a verified credential of a second user;

verify a relationship between the first user and the second user, wherein verifying the relationship comprises establishing a dependency between the first user and the second user such that the first user is classified as a primary user and the second user is classified as a dependent user;

link the first digital ID to the second digital ID based on the dependency such that the primary user is granted increased permissions to access data associated with dependent users to thereby generate a linkage, wherein linking the first digital ID to the second digital ID is subject to one or more configuration rules defining parameters for sharing specific data values between the first user and the second user, and wherein the one or more configuration rules are pre-set by one of the first user or the second user, wherein the linkage is temporary in time and comprises an expiration time period, wherein the expiration time period corresponds to a length of a scheduled event; and substantially simultaneously verify an identity of the first user and an identity of the second user without requiring a presentation of the second digital ID and without requiring an action by the second user by:

outputting, for display on a computing device associated with the primary user, a verification message encompassing data associated with the first digital ID and data associated with the linkage; and scanning the verification message, by a computing system associated with a separate entity, to authenticate the first digital ID and the second digital ID and to verify the linkage.

* * * * *